United States Patent [19]

Bart et al.

[11] Patent Number: 4,565,492

[45] Date of Patent: Jan. 21, 1986

[54] SEALING DEVICE FOR TURBINE BLADES OF A TURBOJET ENGINE

[75] Inventors: Jacques R. Bart, Evry; Gérard E. A. Jourdain, Saintry-sur-Seine; Daniel Rambach, Paris, all of France

[73] Assignee: Societe Nationale d'Etude et de Construction de Moteurs d'Aviation "S.N.E.C.M.A.", Paris, France

[21] Appl. No.: 628,311

[22] Filed: Jul. 6, 1984

[30] Foreign Application Priority Data

Jul. 7, 1983 [FR] France ............................ 83 11646

[51] Int. Cl.[4] ........................................... F01D 11/08
[52] U.S. Cl. .................................... 415/175; 415/116; 415/134; 415/136; 415/138
[58] Field of Search .............. 415/175, 174, 134, 135, 415/136, 115, 116, 117, 177, 180, 170 R, 171, 137, 138; 60/39.75, 39.07

[56] References Cited

U.S. PATENT DOCUMENTS

| | | | |
|---|---|---|---|
| 3,146,992 | 9/1964 | Farrell | 415/136 |
| 4,222,707 | 9/1980 | Drouet et al. | 415/116 |
| 4,317,646 | 3/1982 | Steel et al. | 415/134 |
| 4,375,677 | 4/1983 | Hallinger et al. | 415/116 |
| 4,527,385 | 7/1985 | Jumelle et al. | 415/138 |
| 4,529,355 | 7/1985 | Wilkinson | 415/170 R |

FOREIGN PATENT DOCUMENTS

| | | |
|---|---|---|
| 2450344 | 9/1980 | France . |
| 2450345 | 9/1980 | France . |
| 2467292 | 4/1981 | France . |

Primary Examiner—Robert E. Garrett
Assistant Examiner—John Kwon
Attorney, Agent, or Firm—Bacon & Thomas

[57] ABSTRACT

A sealing device is disclosed for maintaining a small positive clearance between packing segments and the turbine blade tips of a turbojet engine. The packing segments are connected to an inner ring which is, in turn, connected to an outer ring, all disposed within the turbojet casing. The coefficient of thermal expansion of the inner ring is greater than that of the outer ring such that, as air is directed onto the structure from the engine compressor, the differential expansion or contraction of the rings serves to move the packing segment in a radial direction to maintain the clearance between them and the turbine blade tips.

15 Claims, 7 Drawing Figures

SEALING DEVICE FOR TURBINE BLADES OF A TURBOJET ENGINE

BACKGROUND OF THE INVENTION

1. Field of the Invention

The instant invention relates to a sealing device for the turbine blades of a turbojet engine, specifically such sealing devices which are adjustable to maintain a specific clearance between the sealing structure and the turbine blade tips throughout all operating modes of the turbojet operation.

2. Brief Description of the Prior Art

It is important to minimize the clearance between the turbine blade tips and a sealing device in a turbojet engine in order to maximize the efficiency, and the thrust of the engine. Any leaks due to extensive clearance between the rotating and stationary parts of the engine will deleteriously effect the engine performance.

In order to reduce the leakage between the turbine blade tips and the surrounding structure, it is necessary to reduce the clearance between the blade tips and the sealing device to a minimum dimension and to maintain this dimension during both stable and transitory engine operating modes. The sealing device must remain concentric with the axis of rotation of the turbojet engine, and must expand and contract in a radial direction to compensate for the expansion and contraction of the turbine wheel and blades. The wheel and blades will undergo expansion during engine acceleration due to the increase in centrifugal forces and due to the increases in operating temperatures. Conversely, they will contract during periods of engine deceleration or stabilized low power operating modes.

It has been extremely difficult to design a sealing system that surrounds the turbine blade tips and maintains a predetermined, minimum clearance during all stages of the turbojet engine operations. In addition to compensating for the expansion and contraction of the turbine blade tips, the sealing device must also take into consideration the potential action of inertia forces acting on the aircraft engines (load factors in the Z or Y direction) and deformations due to changing thermal characteristics. Additionally, the sealing device must retain its circular shape and cannot assume any degree of ovalness without incurring the risk of contact between the sealing device and the blade tips. Such contact would, at best, cause increases in the leakage between the blade tips and the sealing device, and could possibly cause severe damage to the turbine blade structure.

The prior art devices have attempted to achieve these objectives by constructing a very rigid and heavy, or a very complex sealing system. Both systems have obvious drawbacks in regard to their use on aircraft engines: the first serving to increase the weight of the aircraft; while the second decreases the reliability of the turbojet engine.

The prior art also includes systems utilizing an abradable sealing surface which is worn away by the action of the turbine blades to minimize the clearance between them. However, these systems have not alleviated the leakage problems since, during expansion of the turbine blade tips, they abrade away the sealing surface and, when the operating conditions are such that the turbine blades contract, a large clearance between the blade tips and the sealing device is present. An obvious way of avoiding this problem is to design the sealing device to accommodate the maximum diameter of the turbine blades. However, this introduces excessive leakage during those periods of operation when the turbine blades are not at their maximum diameter.

Although it is known to center the casing supporting the sealing device with respect to the axis of the turbojet engine and provide it with sufficient inertia so that its deformation is essentially negligible, such devices cannot maintain a positive, but very small clearance between the sealing device and the turbine blade tips during both transitory and stabilized operating modes of the turbojet engine.

The prior art has also attempted to adjust the diameter of the sealing device in order to accommodate the expansion and contraction of the turbine blade tips by directing air taken from one or more stages of the turbojet engine compressor onto the sealing device to thereby cause its thermal expansion or contraction in a radial direction. The air is first directed into a distributor which, in turn, distributes the air in a homogeneous manner about the periphery of the sealing device. However, the quantity of air that is necessary to achieve the expansion or contraction of the sealing device in order to accommodate both the centrifugal expansion of the turbine wheel and turbine blades (which occurs in a few seconds) and the subsequent thermal expansion of the turbine wheel (which takes place over several minutes) is usually excessive and results in the decreased efficiency of the turbojet engine compressor. A typical showing of such a system appears in French Pat. No. 2,467,292. Although such air distributors can obviously be designed, as the prior art has indicated, they are extremely complex and, consequently, rather unreliable. Needless to say, a failure of such distributor would result in severe damage to the turbine blade or the sealing device.

As shown in French Pat. Nos. 2,450,344 and 2,450,345, it is known to attempt to solve the problems noted above by making an inner part of the sealing device expand or contract to accommodate for the rapid centrifugal expansion of the turbine wheel and the turbine blade during acceleration and a second part which accommodates the thermal expansion of the turbine wheel. However, such devices have been applied only to relatively low power turbojet engines having reverse flow combustion chambers. Although, in theory, such a system could be applied to the usual direct flow chambers of high power turbojet engines, they would be unduly complicated and inherently unreliable.

Another prior art device which is related to the instant invention is shown in Ser. No. 575,319 to Jumelle et al. filed on Jan. 30, 1984. As shown in this application, sealing sectors are connected to a pair of ring structures, a first ring serving to adjust the radial position of the sealing sectors in a short-term response, while the second ring adjusts the radial position of the sectors over a longer response. The structure shown in this application is substantially different from that set forth in the instant invention. The Jumelle et al. sealing device requires a mechanical seal or a packing on the upstream and the downstream edges of the sealing sectors which produces a substantial amount of friction which, in turn, reduces the effectiveness of radial position adjusting mechanism.

It is also known to utilize an elastic sleeve disposed about the turbine blades which is capable of deformation when exposed to stress. However, the elasticity of the sleeve presents the risk of introducing damage due to the lack of concentricity with the turbine wheel rotational axis due to the oval shape which may be imposed by the effect of load factors encountered in flight. It should be further noted that with the considerable hyperstatic forces generated by the supports in a segmented annulus, such as that shown in French Pat. No. 2,450,345, the slightest heterogeneity in temperature or inertia of the annular structure in the peripheral direction, will cause substantial deformations of the segmented ring. Such deformations will cause either lack of concentricity or result in the ovalization of the sealing structure, two factors, the maintenance of which are absolutely necessary to prevent excessive clearances between the turbine blade and sealing device.

SUMMARY OF THE INVENTION

The instant invention relates to a sealing device which provides a positive, minimum clearance between the sealing device and the turbine blade tips throughout all stabilized or transitory engine operating modes. The invention achieves these results by utilizing an appreciably reduced flow of air taken from the compressor of the turbojet engine so as to not reduce its efficiency, while at the same time achieving the results without the undue complexity and the inherent lack of reliability of the prior art devices.

The invention achieves these objectives by providing an outer ring attached to a plurality of sector hook elements which are slidably attached to the turbojet engine casing. An inner ring is disposed between the upstream and downstream sector hook elements and is attached to both the outer ring and to a plurality of packing segments, also disposed between the upstream and downstream sector hook elements. Each of the packing segments carries a packing or sealing element which is disposed at a close distance from the tips of the turbine blades on a turbine wheel of the turbojet engine. In order to minimize the deleterious effects of the mechanical seals of the prior art devices, each of the packing segments in conjunction with the sealing sectors define a labyrinth seal at the upstream and downstream edges. The labyrinth seal provides an adequate seal for the high temperature gas passing through the turbine, while at the same time minimizing the frictional effects during movement of the packing segments.

Means are also provided to direct air from at least one stage of the turbojet engine compressor onto the inner and outer rings to cause their thermal expansion or contraction. The inner ring has a larger coefficient of thermal expansion than the outer ring (which may be provided with an insulating layer) such that the initial radial expansion/contraction of the inner ring moves the packing segments outwardly or inwardly to maintain the positive clearance between the packing and the turbine blade tips as the blade and wheel undergo thermal and centrifugal expansion/contraction. The outer ring also serves to move the packing segments outwardly or inwardly to accommodate the radial expansion/contraction of the turbine blade tips due to the thermal expansion/contraction of the turbine blade wheel which takes place after a somewhat longer period of time.

BRIEF DESCRIPTION OF THE PREFERRED EMBODIMENTS

Figure 1:
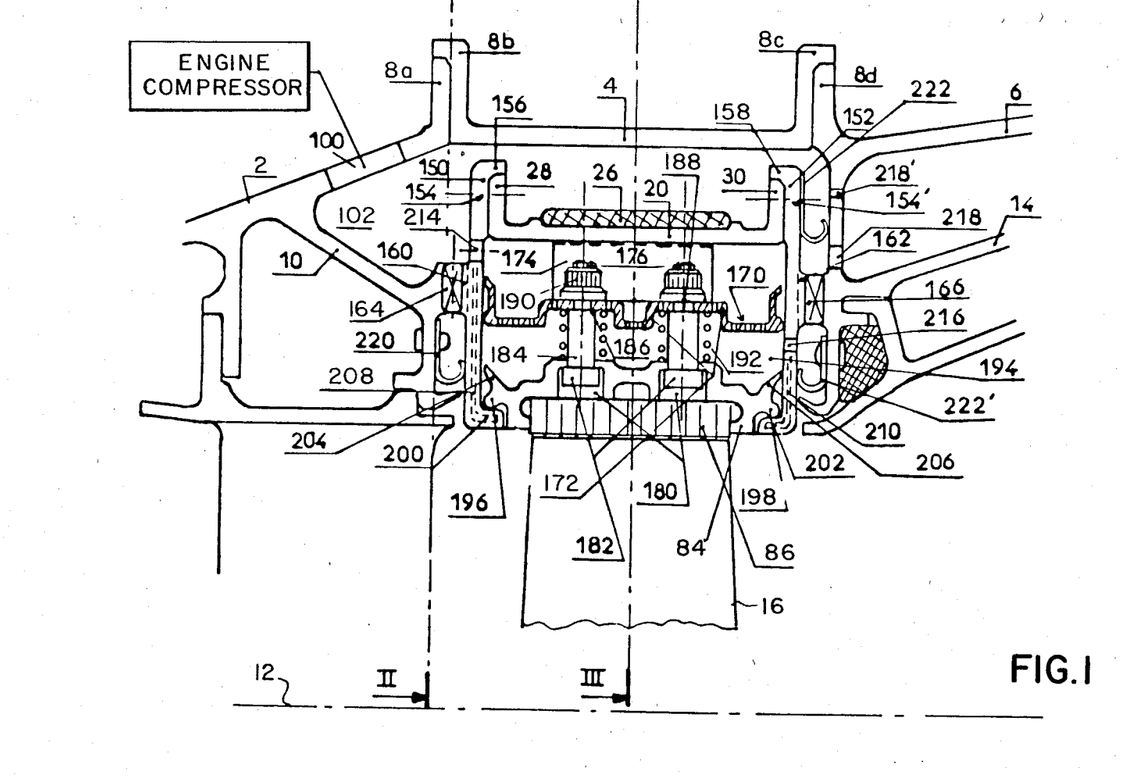
FIG. 1 is a partial, longitudinal sectional view taken along line I—I of FIG. 2 showing a first embodiment of the sealing device according to the invention.

FIG. 1 shows a partial cross-sectional view of the first embodiment of the invention wherein the turbojet engine outer casing comprises an upstream portion 2, a central or median portion 4 and a downstream portion 6. The upstream portion 2 is joined to the median portion 4 by flanges 8a and 8b, while the median portion 4 is joined to the downstream portion 6 by flanges 8c and 8d. Various means may be utilized to attach these portions together via the flanges as is well known to those skilled in the art. Upstream casing portion 2 has internal flange element 10 extending therefrom, while internal structure 14 is connected with downstream casing portion 6.

A plurality of first, upstream sector hook elements are disposed about longitudinal axis 12 of the turbojet engine so as to form an annular structure. A plurality of downstream or second sector hook elements 152 form a similar annular structure.

A single piece outer ring 20 having radially outwardly extending upstream flange 28 and downstream flange 30, upstream flange 28 is attached to the first plurality of sector hook elements 150 via bolts or other fastening means extending along axis 154. Similarly, downstream flange 30 is attached to the second sector hook elements 152 via bolts or other fasteners extending along axis 154'. Outer ring 20 may also have a layer of insulating material 26 disposed thereon. Although only one such layer is shown disposed on the radially outer most surface, it is understood that a similar thermal insulating layer could be disposed on the inner surface of outer ring 20 without exceeding the scope of this invention. Similarly, outer ring 20 could also contain additional radial phalanges to increase its rigidity.

Figure 2:
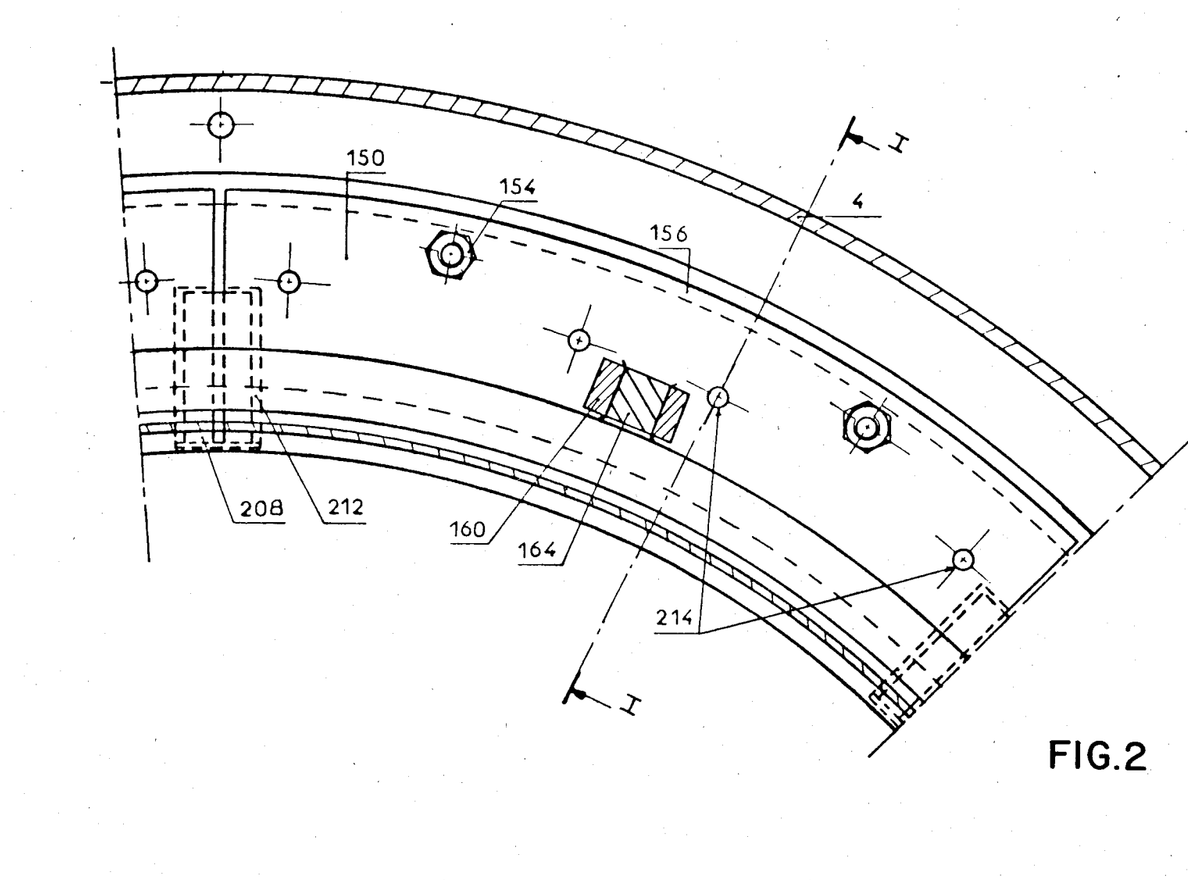
FIG. 2 is a partial, cross-sectional view taken along lines II—II in FIG. 1.

The structure formed by the upstream and downstream sector hook elements and the outer ring 20 is attached to internal structures 10 and 14 of upstream casing portion 2 and downstream casing portion 6, respectively, the innerengagement of at least three upstream projections 160 with corresponding pockets 164 defined by the internal structure 10. Similarly, the downstream sector hook elements define at least three downstream projections 162 which engage corresponding pockets 166 attached to, or formed with internal structure 14. The projections and the corresponding pocket should be equidistantly spaced about the periphery in order to provide accurate radial location of this structure with respect to the longitudinal axis 12. The upstream pockets 164 and the downstream pockets 166 as shown in FIG. 2 are open in the radial direction to allow relative movement in this direction between the sector hook elements and the internal structure of the engine casing. However, any movement in the tangential direction is prohibited by the interengagement of these elements. Upstream sector hook elements 150 also define a flange 156 which extends generally in the downstream direction, while downstream sector hook elements 152 define a similar flange 158 which extends in the upstream direction. These flanges as shown in FIG. 1, extend over the outer periphery of flange 28 and flange 30, respectively, formed on outer ring 20.

Outer ring 20 is composed of a material in which the thickness and/or the thermal insulation layer is chosen such that the resulting structure will have the same thermal expansion response time to correspond to the total thermal and centrifugal expansion/contraction of the turbine wheel after complete thermal stabilization.

Figure 3:
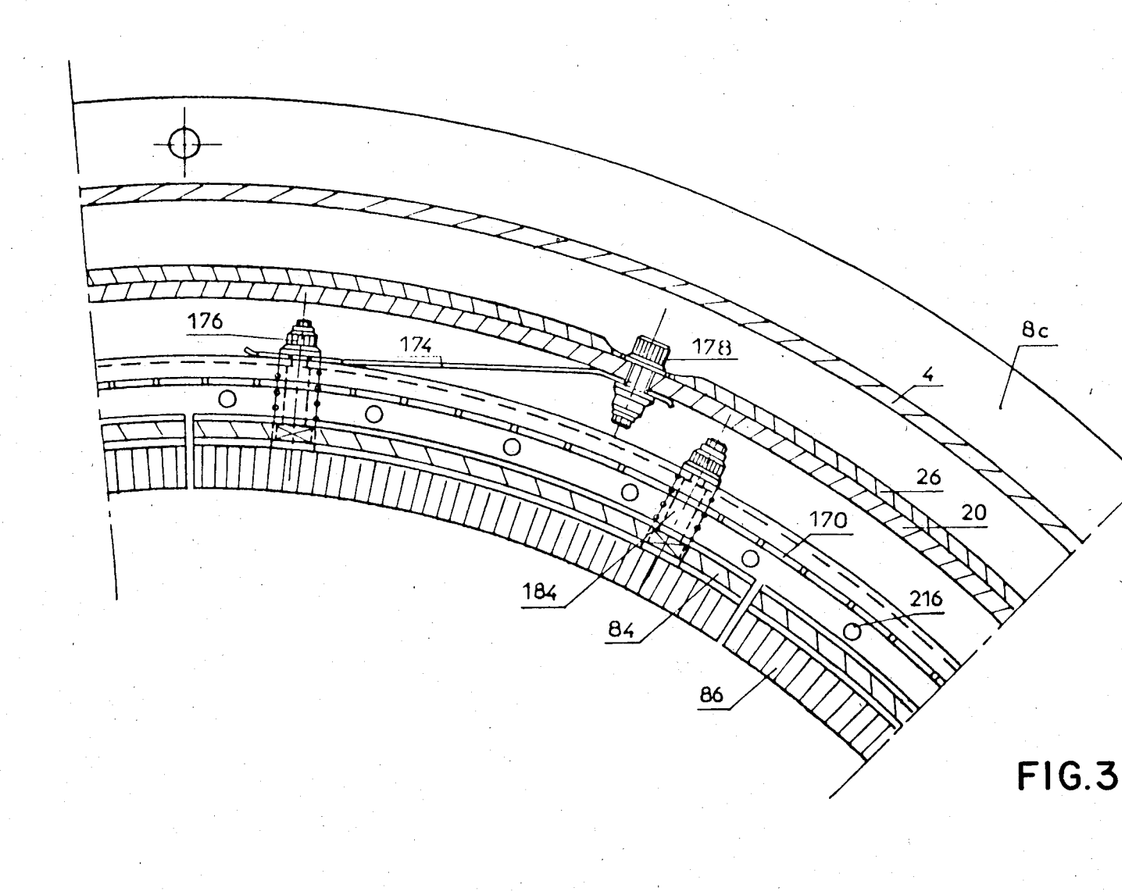
FIG. 3 is a partial, cross-sectional view taken along line III—III of FIG. 1.
Figure 4:
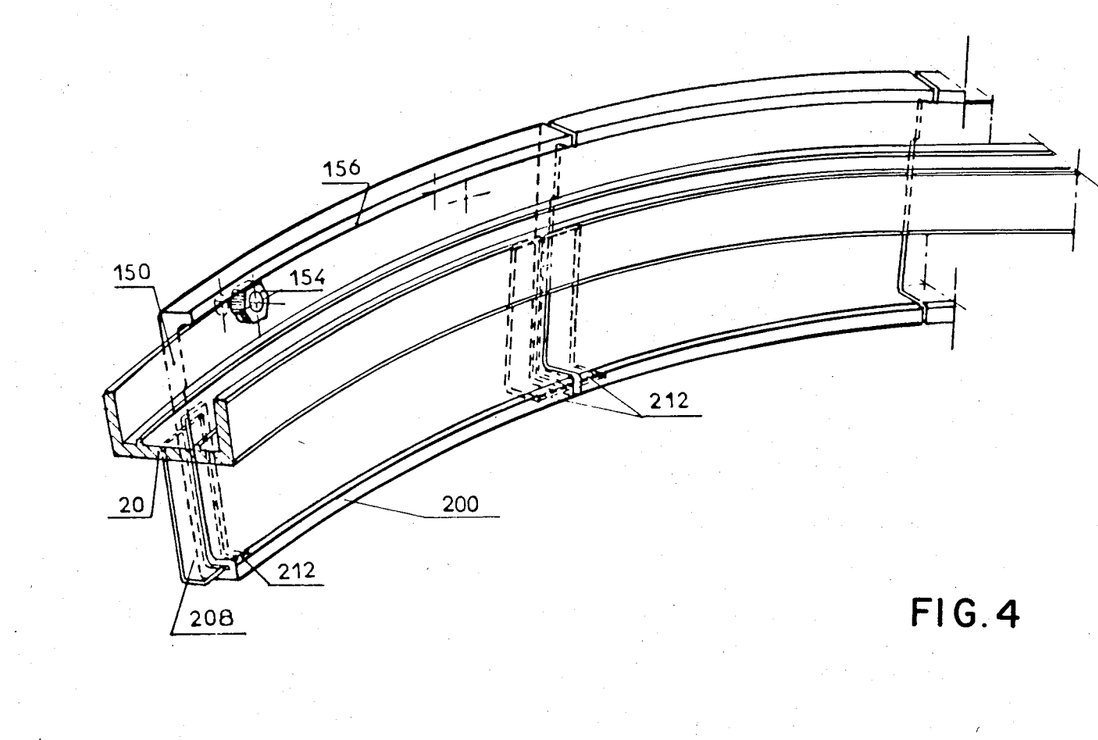
FIG. 4 is a partial perspective view showing the connections between the outer ring and the sector hook elements of the embodiment in FIG. 1.

An inner ring 170 is also disposed between the first sector hook elements 150 and the second sector hook elements 152. However, inner ring 170 is not attached to these elements, but may move in a radial direction with respect thereto. Inner ring 170 is formed of a single piece of material and has radial portions 172 to increase its rigidity in the radial direction. As shown in FIG. 1, inner ring 170 is disposed radially inwardly of outer ring 20 and is attached thereto by at least three resilient connecting members 174. As best seen in FIG. 3, resilient connecting members 174 extend in a generally circumferential direction and have one end attached to inner ring 170 via bolts 176 and the other end attached to outer ring 20 by bolts 178. Although two bolts are shown connecting each end of the connecting members to the rings, quite obviously other fastening or attaching means may be utilized without exceeding the scope of the invention. The three connecting members 174 should be equidistantly spaced about the circumference of the inner ring 170 and should all extend in generally the same direction. This will serve to accurately locate inner ring 170 with respect to outer ring 20, while at the same time, the resiliency of the connecting members 174 will permit relative radial movement of the inner and outer rings with respect to each other.

Although a minimum number of three connecting members are required, a greater number can be utilized without exceeding the scope of the invention. In the FIGS. it is assumed that four such resilient connecting members are utilized, one being located at the top of the rings and the remaining connecting members being spaced apart by 90°. This provides for the maintenance of the concentricity of the inner and outer rings and prevents relative displacement of one ring with respect to the other during forces exerted on the engine due to maneuvers executed by the aircraft to which the engine is attached. In the case of vertical acceleration, the top and bottom connecting members may bend under such forces exerted thereon and the inner ring 170 could move off center under the effect of these forces if there were no connecting members located on the horizontal axis. However, these latter prevent such downward deflection and retain the concentricity of the inner and outer rings. Similarly, the top and bottom connecting members prevent any lateral displacement due to lateral forces exerted on the engine.

Although resilient connecting members 174 are shown connecting the inner and outer rings, it is understood that other systems could be utilized to concentrically attach the inner and outer rings together, such as the inter-engagement of projections and pockets similar to elements 160 and 164 previously described.

Although inner ring 170 is of single piece, unitary construction, it defines a plurality of holes (shown in FIGS. 1 and 3) which extend therethrough in a generally radial direction. The function of these holes are to facilitate the passage of air therethrough, which will be described in more detail hereinafter. The material of the inner ring 170 is selected so as to have a greater coefficient of thermal expansion than the outer ring 20 and such that its response time closely approximates the expansion/contraction of the tips of the turbine blades 16 due to thermal expansion/contraction and centrifugal expansion/contraction of the turbine blades and turbine wheel. The relatively slower expansion/contraction of outer ring 20 accommodates for the expansion/contraction of the turbine blade tips due to thermal expansion/contraction of the turbine wheel. Since the turbine wheel is of substantially greater mass than the turbine blades, it will expand or contract at a slower rate.

A plurality of packing segments 84 each containing a packing or sealing element 86 are attached to inner ring 170 by bolts 184. The radially outer most end of bolts 184 are formed with a longitudinally extending shoulder 186 which bears against the inner surface of the inner ring 170. Nuts or similar fasteners 190 serve to rigidly attach the bolts to the inner ring. The heads 182 of bolts 184 are retained in pockets 180 formed in the packing segments. The radial dimension of these pockets exceed the thickness of the heads 182, to allow the packing segments 84 to move radially with respect to bolt heads 182. This amount of movement should be equal to the total expansion of the turbine blade and wheel between the at rest and full throttle speeds. Compression springs 192 are located around the bolts 184 and extend between the inner ring 170 and the packing segments 84.

The upstream and downstream edges of each of the packing segments define a labryinth seal in conjunction with upstream and downstream sector hook elements 150 and 152, respectively. The radially inner most edges of upstream sector hook elements 150 are formed with a generally downstream facing flange 200, while the downstream sector hook elements 152 are formed with a generally upstream facing flange 202. The space between adjacent sector hook elements, both upstream and downstream, are sealed by sealing plates 208 which extend between adjacent sector hook elements and are retained in slots formed on their radial edges. The precise construction of these sealing plates is well known to those skilled in the art and no further discussion of this aspect is believed to be necessary. Plates 210 serve a similar sealing function between the adjacent downstream sector hook elements 152.

The labyrinth seals defined by the sealing segments 84 and the upstream and downstream sector hook elements serves to prevent passage of hot gases passing across turbine blade 16 into space 194 defined between the sealing sectors and the inner ring 170. The upstream edge of packing segment 84 comprises an annular bead portion 196 which extends generally away from the packing segment such that it overlaps flange 200 formed on the inner most portion of the upstream sector hook 150. An annular tongue portion 204 is located radially outwardly of the bead portion 196 and extends in a direction generally away from the packing segment 84 towards the sector hook element 150. The downstream edge of the packing segments have a similar annular bead portion 198 which overlaps flange 202 and annular tongue portion 206 which extends generally toward the downstream sector hook element 152.

The annular bead portions 196 and 198 have a small positive longitudinal clearance with the sector hook 150 and 152 such that no frictional force is generated as the sealing sectors 84 move in a radial direction with respect to the upstream and downstream sector hooks 150 and 152. Even when the annular bead portions 196 and 198 are displaced radially outwardly of flanges 200 and 202, respectively, the labyrinth seal formed between the bead portion, the tongue portion, and the sector hook elements, preserve the seal between the hot gases passing over the turbine blade and space 194. Thus, sealing sectors may be radially displaced outwardly without creating large air leaks and at the same time the frictional forces generated as a result of such relative movement are held to an absolute minimum.

As shown schematically in FIG. 1, air is taken from one of the high pressure stages of the turbojet compressor and is passed into chamber 102 through orifices 100. The air then passes through the plurality of orifices 214 defined by upstream sector hook elements 150 into the annular space between outer ring 20 and inner ring 170. The air then passes through the plurality of holes defined by the inner ring 170 into the space 194 between the inner ring 170 and the packing segments 84. The downstream sector hook elements 152 define a plurality of orifices 216 which allows the air to pass out of space 194 and through openings 218 formed in the downstream casing portion 6. The air then may be passed to an exhaust or to a later stage of the turbine as necessary.

A portion of the air from chamber 102 may also be conducted across the radially outer surface of outer ring 20 and then through orifices 218' formed in the downstream casing 6.

Sealing elements 220, 222 and 222' are provided between the upstream and downstream sector hook elements and the upstream and downstream portion of the engine casing. These seals are relatively soft and constructed such that they exert minimal frictional contact so as not impede the radial movement of the sector hooks with respect to the engine casing.

The operation of the device will now be described assuming that the engine is at rest. After starting, the radius defined by the turbine blade tips will increase due to the effects of centrifugal expansion and thermal expansion caused by contact of the hot engine exhaust gases with the turbine blades and turbine wheel. Upon reaching a stable idling condition it will be assumed that the elements of the invention are in the position shown in FIG. 1 and that a small positive clearance exists between the tips of the turbine blades 16 and the packing seal element 86. Upstream and downstream annular bead portion 196 and 198, respectively, rest against flanges 200 and 202 under these conditions.

When the engine is accelerated to full throttle, the ends of the turbine blades will initially expand very rapidly (on the order of 5 to 6 seconds) as the result of the centrifugal expansion of the turbine wheel and the blade and the thermal expansion of the turbine blades. Since the blades are relatively thin, compared to the turbine wheel itself, the thermal response time is generally on the same order as the response to the centrifugal acceleration. Simultaneously with this acceleration, the flow of hot air passing into chamber 102 from the engine compressor will also increase. The increased air contacting the inner ring 170 will cause this ring to expand such that its response time is similar to the expansion of the turbine blade tips. By suitably choosing the material of the inner ring 170, particularly its coefficient thermal expansion, the radial expansion of this ring will be approximately equal to the radial displacement of the turbine blade tips and will occur during the same time period. Thus, as inner ring 170 expands radially outwardly, it also moves the packing segments radially outwardly through bolts 184. This serves to maintain the clearance between the sealing element 86 and the turbine blade tips. This movement also causes the annular bead portions 196 and 198 to move away from sector hook flanges 200 and 202, respectively, but the leakage of air around the upstream and downstream edges of the packing segments will be held to a minimum due to a labyrinth seal formed at these edges.

During this time, outer ring 20 begins to expand, although due to its thermal expansion characteristics, it does so at a slower rate than inner ring 170. The expansion occurs rather rapidly at the onset of heating, but becomes slower over a period of time. By the inner engagement of flanges 28 and 30 with the longitudinal flanges 156 and 158, the sector hook elements will also be moved radially outwardly as the outer ring 20 expands. This radially outward movement continues until the flanges 200 and 202 once again make contact with the annular bead portions 196 and 198 respectively. This time is on the order of tens of seconds (approximately 35 seconds in a test sample) thereby restoring the tightness of the seal between the upstream and downstream sector hook elements. The thermal expansion of ring 20 continues such that it approximately matches the thermal expansion of the turbine wheel. Such expansion of the turbine wheel serves to further increase the radius defined by the turbine blade tips, and the thermal expansion of ring 20 moves the packing segments radially outwardly to accommodate this increase and to maintain the positive clearance between packing seal element 86 and the blade tips. Although inner ring 170 may have reached its maximum expansion, packing segments 84 may be moved radially outwardly with respect thereto due to the clearance between bolt heads 182 in pockets 180. Thus, by overcoming the force of compression springs 192, packing segments 84 may be moved relatively outwardly with respect to inner ring 170.

The resilient nature of the connecting members 174 also permit relative movement between the inner and outer rings.

A similar interaction of the elements takes place as the engine speed is slowed from its maximum stable velocity to idle or other partial throttle operations. Within a relatively short period of time, centrifugal contraction of the turbine wheel and blades as well as the thermal contraction of the blades will take place. During this operation, the air from the engine compressor will be relatively cooler thereby causing inner ring 170 and outer ring 120 to radially contract. Compression springs 192 will maintain contact between the annular bead portions 196 and 198 with flanges 200 and 202, respectively throughout the contraction cycle. This ensures an effective sealing in both the upstream and downstream direction throughout the entire phase of deceleration.

Figure 5:
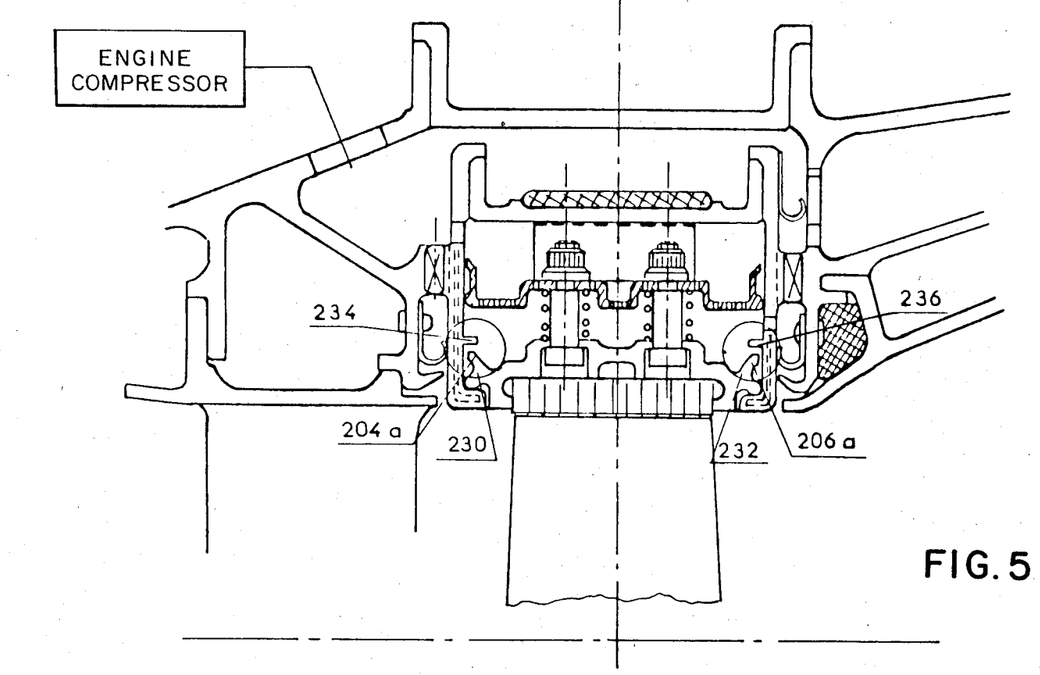
FIG. 5 is a partial, longitudinal sectional view showing the sealing device according to a second embodiment of the invention.
Figure 6:
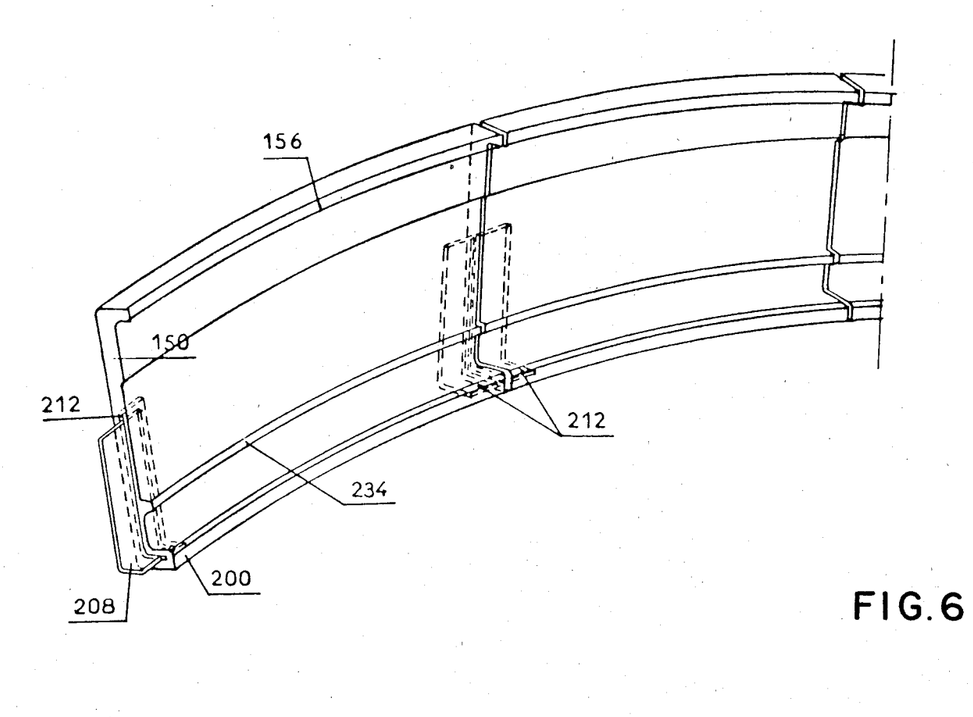
FIG. 6 is a partial perspective view showing the sector hook elements according to the second embodiment of the invention.

A second embodiment of the invention is shown in FIGS. 5 and 6. The construction and interrelationship between the packing segments, the inner ring, the outer ring and the sector hook elements are the same as in the embodiment previously described. The only difference being the presence of annular flanges 234 and 236 on the upstream sector hook elements 150 and downstream sector hook elements 152, respectively. The annular tongue portions 204a and 206a may also have a slightly different form so as to form a more effective seal when they contact flanges 234 and 236. The interrelationship of the annular tongue portion 204a and 206a with flanges 234 and 236, respectively, further improves the sealing during the transitory acceleration phase of the engine operation. As the inner ring and packing segments 84 expand radially outwardly, the extremeties of the annular tongue portions contact the flanges 234 and 236 to provide a more effective seal. Even prior to contact between the flanges and the annular tongue portions, the interrelationship of these elements provide a more effective labyrinth seal so as to provide an increased sealing effect.

Figure 7:
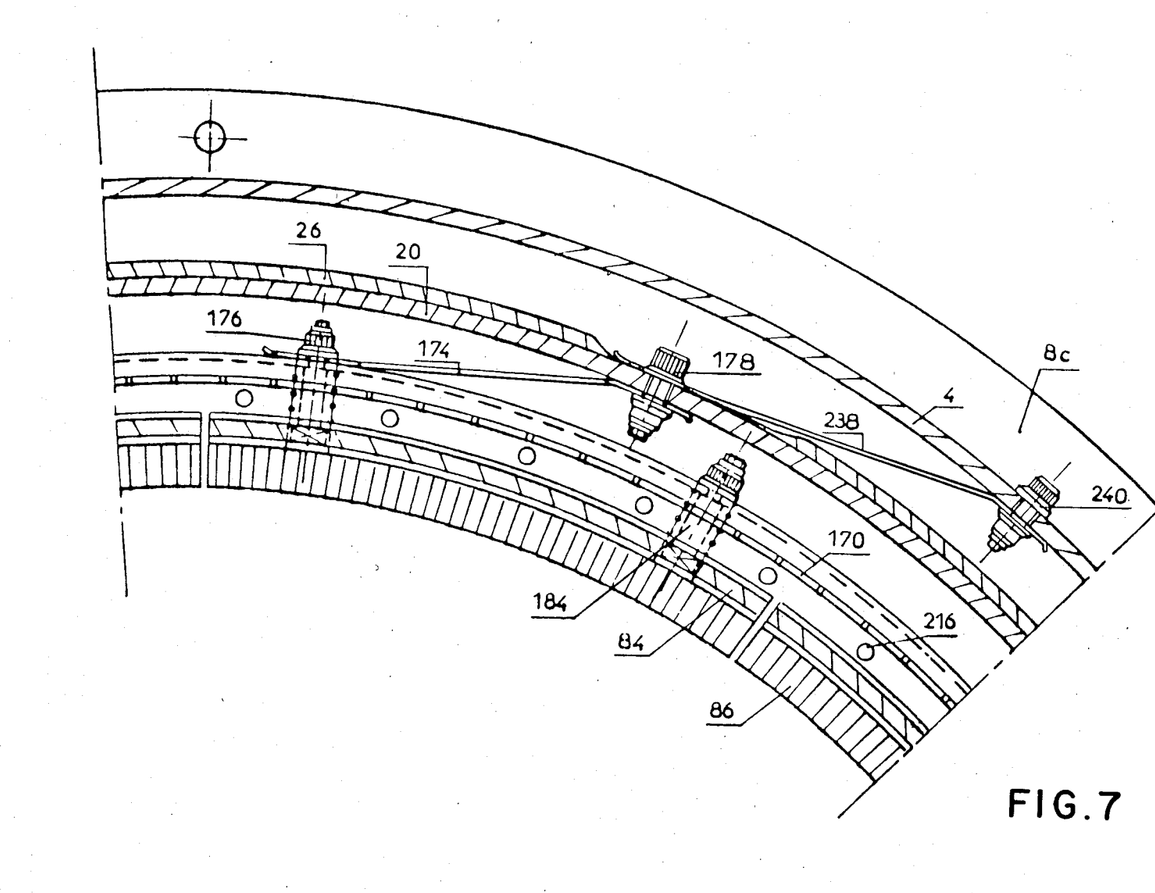
FIG. 7 is a partial cross-sectional view showing a third embodiment of the sealing device according to the invention.

A third embodiment of the invention as shown in FIG. 7 wherein the outer ring 20 is attached to the median engine casing portion 4 by a second plurality of connecting members. The structure and function of these members 238 is similar to the connecting members 174 which serve to interconnect the outer ring 20 with the inner ring 170. At least three of the second resilient connecting member 238 are equidistantly about the circumference of outer ring 20 and each have one end attached thereto via bolts 178, while the other end is connected to casing portion 4 by bolts 240. The resilient nature of connecting members 238 permit relative radial motion between outer ring 20 and casing portion 4. As shown in FIG. 7, bolts 178, which are utilized to attach one end of first connecting members 174 to the outer ring 20 may also be utilized to connect the end of second connecting members 238 to this ring.

The foregoing descriptions of the various embodiments have been provided for illustrative purposes only and should not in any way be construed as limiting this invention the scope of which is determined solely by the apended claims.

What is claimed is:

1. In a turbojet engine having a compressor, an outer casing having a longitudinal axis and at least one turbine wheel rotatably mounted within the casing, the turbine wheel having a plurality of turbine blades attached thereto, an improved device for effecting a seal between the turbine blade tips and the outer casing during transitory and stabilized engine operating modes, comprising:
  (a). a plurality of first sector hook elements attached to the outer casing at a position upstream of the turbine blades so as to be movable in a radial direction with respect to the outer casing;
  (b). a plurality of second sector hook elements attached to the outer casing at a position downstream of the turbine blades so as to be movable in a radial direction with respect to the outer casing;
  (c). a one piece outer ring having an upstream end attached to the first sector hook elements and a downstream end attached to the second sector hook elements;
  (d). a one piece inner ring disposed between the first and second sector hook elements and located radially inwardly with respect to the outer ring, the inner ring having a greater coefficient of thermal expansion than the outer ring;
  (e). at least three resilient first connecting members each connected to the outer ring and the inner ring and extending in a generally circumferential direction;
  (f). a plurality of packing segments disposed bewteen the first and second sector hook elements, an inner sealing surface of the packing segments disposed in close proximity to the tips of the blades;
  (g). connecting means to connect each of the packing segments to the inner ring;
  (h). labyrinth seal means associated with an upstream and downstream edge of each packing segment to form a labyrinth seal in conjunction with the first and second sector hook elements; and,
  (i). means to direct air from a stage of the compressor onto the outer and inner rings such that thermal expansion/contractor of the outer and inner rings moves the packing segments radially outwardly-/inwardly corresponding to the expansion/contraction of the turbine blade tips so as to maintain clearance bewteen the blade tips of the packing segments and to prevent excess air leakage therebetween.

2. The improved sealing device according to claim 1 further comprising a layer of thermal insulation material attached to the outer ring.

3. The improved sealing device according to claim 2 wherein the layer of thermal insulation material is attached to the outer periphery of the outer ring.

4. The improved sealing device according to claim 1 wherein each of the plurality of first sector hook elements has a first flange extending in a downstream direction from its radially innermost periphery.

5. The improved sealing device according to claim 4 wherein each of the plurality of second sector hook elements has a second flange extending in an upstream direction from its radially innermost periphery.

6. The improved sealing device according to claim 5 wherein the labyrinth seal means on each of the upstream and downstream edges of the packing segments comprise: an annular bead portion extending away from the packing segment so as to overlap the flanges on each of the first and second sector hook elements; and, an annular tongue portion located radially outwardly of the annular bead portion and extending generally toward the sector hook elements.

7. The improved sealing device according to claim 6 wherein the inner ring defines a plurality of radially extending holes to allow passage of the air from the compressor therethrough.

8. The improved sealing device according to claim 7 wherein the plurality of first sector hook elements define a plurality of generally longitudinally extending holes to allow passage of the air from the compressor.

9. The improved sealing device according to claim 8 wherein the plurality of second sector hook elements define a plurality of generally longitudinally extending holes to allow passage of the air from the compressor.

10. The improved sealing device according to claim 9 wherein the first sector hook elements further comprise a third flange extending in a downstream direction and located radially outwardly of the annular tongue portion of the labyrinth seal.

11. The improved sealing device according to claim 10 wherein the second sector hook elements further comprise a fourth flange extending in an upstream direction and located radially outwardly of the annular tongue portion of the labyrinth seal.

12. The improved sealing device according to claim 9 wherein the outer ring has radially outwardly extending flanges extending from its upstream and downstream edges and further comprising fastening means to attach the first and second sector hook elements to the upstream and downstream flanges, respectively.

13. The improved sealing device according to claim 12 further comprising at least three resilient second connecting members each connected at one end to the outer ring and at a second end to the outer casing.

14. The improved sealing device according to claim 13 wherein the resilient second connecting members are equidistantly spaced about the longitudinal axis of the outer casing.

15. The improved sealing device according to claim 9 wherein the resilient first connecting members are equidistantly spaced about the longitudinal axis of the outer casing.

* * * * *

UNITED STATES PATENT AND TRADEMARK OFFICE
CERTIFICATE OF CORRECTION

PATENT NO. : 4,565,492
DATED : January 21, 1986
INVENTOR(S) : BART et al

It is certified that error appears in the above-identified patent and that said Letters Patent is hereby corrected as shown below:

Col. 3, line 40: "segements" should read --segments--;
Col. 4, line 51: "phalanges" should read --flanges--;
Col. 4, line 56: "innerengagement" should read --interengagement--
Col. 6, line 17: "expansion/-" should read --expansion/--;
Col. 8, line 20: "inner" should read --inter--;
Col. 9, line 39: "apended" should read --appended--;

IN THE CLAIMS:

Col. 10, line 14: "outwardly-" should read --outwardly/--;
Col. 10, line 17: "bewteen" should read --between--.

Signed and Sealed this

Twenty-third Day of September 1986

[SEAL]

Attest:

Attesting Officer

DONALD J. QUIGG

Commissioner of Patents and Trademarks